Aug. 28, 1928.  
D. M. BURMISTER  
SURVEYING INSTRUMENT  
Filed April 16, 1927

Inventor  
Donald M. Burmister  
By his Attorneys  
Kenyon & Kenyon

Aug. 28, 1928.
D. M. BURMISTER
1,682,034
SURVEYING INSTRUMENT
Filed April 16, 1927     2 Sheets-Sheet 2
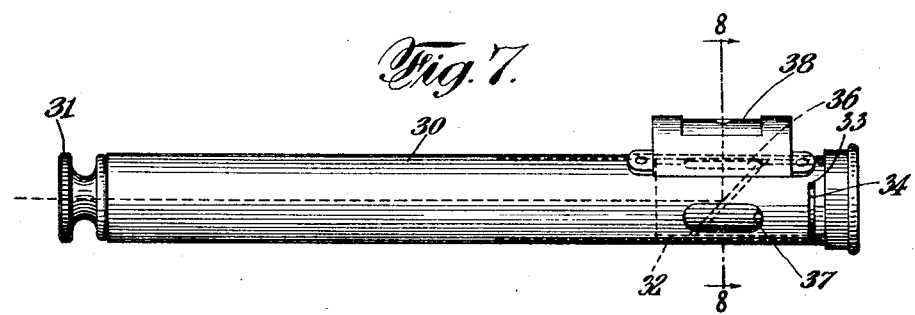
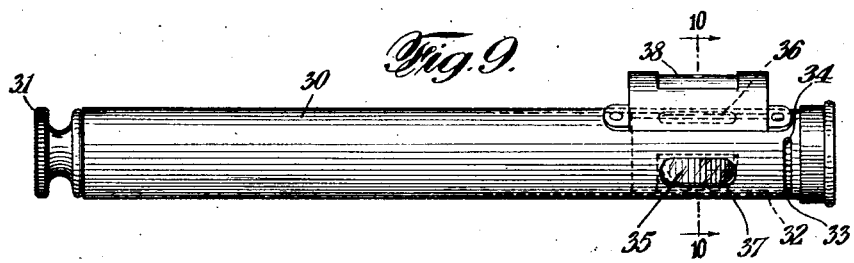
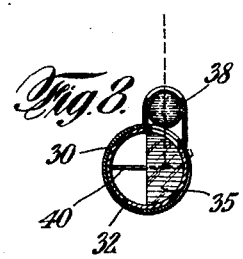 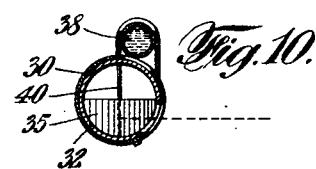
 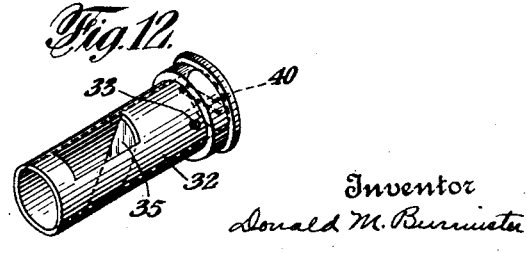
Inventor
Donald M. Burmister
By his Attorneys
Kenyon & Kenyon Patented Aug. 28, 1928.

1,682,034

UNITED STATES PATENT OFFICE.

DONALD M. BURMISTER, OF NEW YORK, N. Y., ASSIGNOR TO THE KEUFFEL & ESSER COMPANY, OF HOBOKEN, NEW JERSEY, A CORPORATION OF NEW JERSEY.

SURVEYING INSTRUMENT.

Application filed April 16, 1927. Serial No. 184,213.

This invention relates to surveying instruments.

For certain types of surveying, surveyors make use of instruments known as hand levels, a particular type of which is known as Abney levels. In many of these surveying operations, it is necessary to lay off a right angle; that is, to sight a point at right angles to the line of survey. In order to do this, it has been customary to use an angle mirror.

An object of this invention is an instrument which may be used both for sighting levels and sighting right angles.

In its preferred embodiment, this instrument consists of a casing having an eyepiece at one end and a thin metal sighting strip at the other end. Intermediate the ends of the casing is arranged an angle mirror which is of less width than the casing and which is so disposed that its edge and said sighting strip are perpendicular to each other when viewed through the eyepiece. An aperture is provided in the casing in alignment with the mirror and above the aperture is arranged a level. By means of the angle mirror, an image of the bubble of the level is reflected into the field of view through the eyepiece. There is also provided a second aperture similar to the first aperture but angularly related thereto. Means are provided for rotating the sighting strip and the angle mirror through an angle equal to that between the apertures.

When the instrument is to be used to sight levels, the angle mirror is arranged in alignment with the first-mentioned aperture, the sighting strip being horizontal when the instrument is held with the level vertically disposed above the aperture. Through that portion of the casing not cut off by the angle mirror is viewed the object sighted. On the angle mirror is viewed an image of the level bubble. When the bubble coincides with the sighting strip the object crossed by the sighting strip is in the same horizontal plane as the eyepiece. To use the instrument for sighting a point at right angles to the line of survey the mirror and sight strip are rotated until the angle mirror is in alinement with the second aperture and the casing turned if necessary so that the sight strip is vertical. The instrument is then sighted along the line of survey by means of the sight strip and in the mirror is observed the object which appears thereon in alinement with the sighting strip. This object is at right angles to the line of survey.

Other objects, novel features, and advantages of this invention will be apparent from the following specification and accompanying claims, wherein Fig. 1 is a side elevation of one embodiment of the invention;

Fig. 7 is a side elevation of a modified form of instrument arranged to be used in sighting levels;

Fig. 8 is a section on the line 8—8 thereof;

Fig. 9 is a side elevation of the instrument arranged for use in sighting right angles;

Fig. 10 is a section on the line 10—10 of Fig. 9;

Fig. 11 is a perspective view of one end of the instrument casing, and

Fig. 12 is a perspective view of the support for the angle mirror and the sighting strip.

Figure 1:
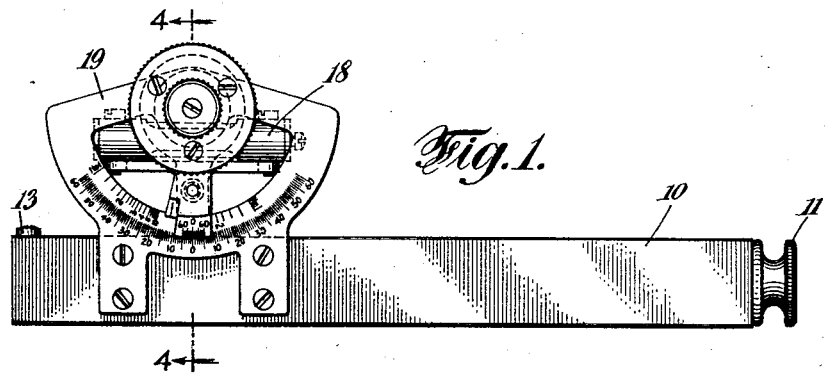

Referring now to the modification disclosed in Figs. 1 to 6 inclusive, 10 designates a tubular casing which is square in cross-section as is usual with Abney levels. At one end of the casing is provided an eyepiece 11. In the opposite end of the casing is fitted a tubular supporting member 12. The support 12 is provided with a stud 13 which is adapted to seat in any one of the grooves 14 provided for that purpose. At the inner end of the support 12 is provided a mirror or reflecting surface 15 which forms an angle of 45° with two sides of the support. The mirror 15 is of a width equal approximately to half that of the opening through the support. Two apertures 16 and 17 are provided in opposite walls of the casing 10 and are arranged on opposite sides of the median plane through the casing. Thus when the support 12 is arranged in the casing with the projection 13 in one slot 14, the mirror 15 is in alinement with one of said apertures and when arranged with the projection 13 in the other of the slots 14 it is in alinement with the other of said apertures. Directly above the aperture 16 is supported a level 18 which when the angle mirror 15 is in alinement with the aperture 16 is reflected into the field of view of the eyepiece 11. The level 18 is pivotally supported from a standard 19 so that it may be set for use in sighting angles as well as horizontals. A sight strip 20 extends across the end of the support 12 and is so arranged that when viewed through the eyepiece it is perpendicular to the edge of the mirror 15, their apparent point of intersection being on the center line of the instrument.

Figure 2:
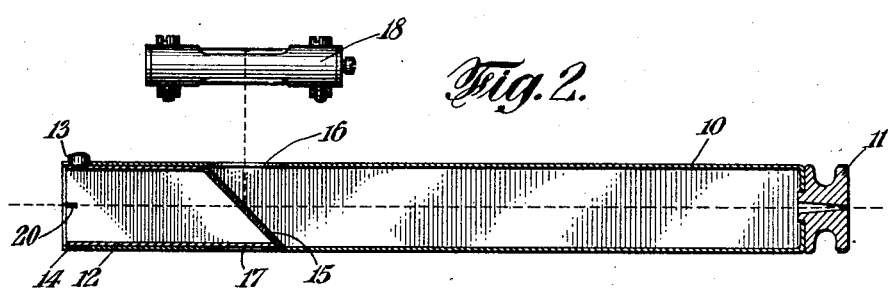
Fig. 2 is a vertical longitudinal section showing the instrument arranged for use to sight angles.
Figure 3:
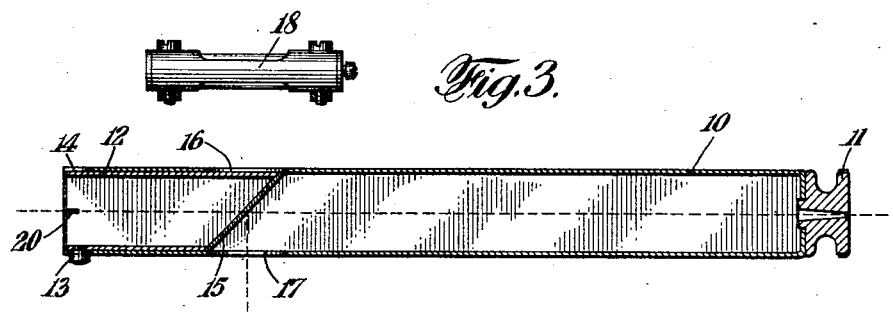
Fig. 3 is a horizontal longitudinal section showing the instrument arranged for use in sighting right angles.
Figures 4, 5, 6:
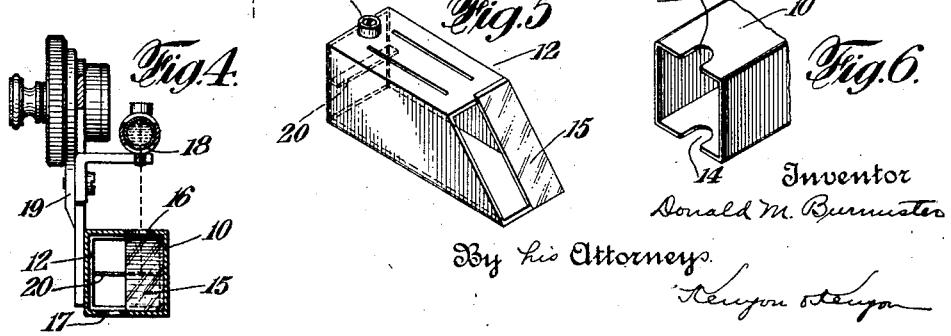
Fig. 4 is a section on the line 4—4 of Fig. 1.
Fig. 5 is a detail view of the support for the angle mirror and the sighting strip.
Fig. 6 is a perspective view of the end of the casing in which the sight strip is mounted.

When this instrument is to be used for sighting horizontals or vertical angles, the support 12 is arranged in the casing as shown in Figs. 1, 2 and 4. The mirror 15 is in alinement with the aperture 16 and the level 18 is vertically disposed above the aperture 16. The instrument is then adjusted until the image of the bubble of the level which is reflected by the mirror 15 into the field of view of the eyepiece is in alinement with the sighting strip 20, viewed through the space unoccupied by the mirror 15. The object in alinement with the strip 20 is noted and it is either in the same horizontal plane with the eyepiece or at the desired vertical angle relative thereto. To use the instrument in sighting the right angles to the line of survey the support 12 is withdrawn from the casing and re-inserted with the stud 13 seated in the other of the grooves 14, thereby bringing the mirror 15 into alinement with the aperture 17 as shown in Fig. 3. The casing is turned through an angle at 90° so that the sighting strip 20 is vertical. By means of the strip 20 the instrument is then sighted along the line of survey. By means of the mirror 15, observation is made of the object which appears in the mirror in alinement with the strip 20. Because of the 45° angle of the mirror to the line of survey, this object is at right angles to the line of survey.

Referring now to Figs. 7 to 12 inclusive, 30 is a tubular casing which in this instance is circular in cross-section and 31 is the eyepiece. In the opposite end of the casing 30 is provided a support 32 which is circular in cross-section and which may be turned about the center line of the instrument through an angle of 90°, the extent of rotation being limited by a stud 33 extending into a 90° slot 34. At the inner end of the support 32 is provided a mirror or reflecting surface 35 which is of substantially semi-circular configuration and arranged at a 45° angle. In the casing 30 are provided apertures 36 and 37 which are similar to each other and spaced from each other by 90°. These apertures are so arranged that in one position of the support 32 the mirror 35 is in alinement with the aperture 36 and in another position of the support 32 is in alinement with the aperture 37. Overlying the aperture 36 is a level 38 which is fixed with respect to the casing. At the outer end of the casing 32 is provided a sight strip 40 which when viewed through the eyepiece 31 is perpendicular to the edge of the mirror 35 and their apparent point of intersection lies on the center line of the instrument. To use the instrument in sighting an object at right angles to the line of survey the support 32 is rotated to bring the mirror 35 into alinement with the aperture 37, thereby placing the sight strip 40 in vertical position. The instrument is then sighted along the line of survey and observation is made of the object reflected by the mirror and appearing thereon in alinement with the sight strip. This object is then at right angles to the line of survey.

Although in the modification disclosed in Figs. 1 to 6 inclusive the apertures 16 and 17 are shown as being 180° apart, they might equally well be arranged 90° apart as shown in the modification disclosed in Figs. 7 to 12 inclusive. Likewise in the modification disclosed in Figs. 7 to 12 the apertures 36 and 37 might equally well be 180° apart instead of 90° apart. It is, of course, understood that various other changes may be made in the structure of the device without in any way departing from the spirit of the invention as defined in the appended claims.

I claim:

1. A device of the character described comprising a casing having an eyepiece at one end, a sight strip at the other end, an angle mirror intermediate the ends of the casing and having an edge which is perpendicular to said sight strip when viewed through said eyepiece, a pair of angularly-related apertures in said casing, and means for supporting said mirror and sight strip within said casing to present said mirror in alignment with either of said apertures.

2. A device of the character described comprising a casing having an eyepiece at one end, a sight strip at the other end, an angle mirror intermediate the ends of the casing and having an edge which is perpendicular to said sight strip when viewed through said eye-piece, a pair of angularly-related apertures in said casing, a level in alignment with one of said apertures, and means for supporting said mirror and sight strip within said casing to present said mirror in alignment with either of said apertures.

3. A device of the character described comprising a casing having an eyepiece at one end, means at the opposite end defining a sight line, an inclined reflector intermediate the ends of said casing and having an edge which, when viewed through the eyepiece, meets said sight line at right angles, a plurality of angularly spaced apertures in said casing, and means for presenting said reflector in alinement with any of said apertures.

4. A device of the character described comprising a casing having an eyepiece at one end, means at the opposite end defining a sight line, an inclined reflector intermediate the ends of said casing and having an edge which, when viewed through the eyepiece, meets said sight line at right angles, a plurality of angularly spaced apertures in said casing, means for presenting said reflector in alinement with any of said apertures, and a level in alinement with one of said apertures.

5. A device of the character described comprising a casing having an eyepiece at one end, a member defining a sight line at the other end of said casing, an inclined reflector intermediate the ends of the casing and having an edge which, when viewed through said eyepiece, meets said sight line at right angles, and a plurality of angularly spaced apertures in said casing, said reflector and sight line being permanently fixed with relation to each other and being supported in said casing to present said reflector in alinement with any of said apertures as desired.

6. A device of the character described comprising a casing having an eyepiece at one end, a member defining a sight line at the other end of said casing, an inclined reflector intermediate the ends of the casing and having an edge which, when viewed through said eyepiece, meets said sight line at right angles, a plurality of angularly spaced apertures in said casing, said reflector and sight line being permanently fixed with relation to each other and being supported in said casing to present said reflector in alinement with any of said apertures as desired, and a level in alinement with one of said apertures.

7. A device of the character described comprising a casing having an eyepiece at one end and a plurality of angularly spaced apertures intermediate its ends, a sleeve mounted in the other end of said casing, a member supported by said sleeve and defining a sight line, and an inclined reflector supported by said sleeve and having an edge which, when viewed through the eyepiece, meets said sight line at right angles, said sleeve being movable in said casing to present said reflector in alinement with any of said apertures.

8. A device of the character described comprising a casing having an eyepiece at one end and a plurality of angularly spaced apertures intermediate its ends, a sleeve mounted in the other end of said casing, a member supported by said sleeve and defining a sight line, an inclined reflector supported by said sleeve and having an edge which, when viewed through the eyepiece, meets said sight line at right angles, said sleeve being movable in said casing to present said reflector in alinement with any of said apertures, and a level in alinement with one of said apertures.

In testimony whereof, I have signed my name to this specification.

DONALD M. BURMISTER.